(12) United States Patent
Higaki

(10) Patent No.: US 11,526,963 B2
(45) Date of Patent: Dec. 13, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoshinari Higaki, Atsugi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 167 days.

(21) Appl. No.: 16/889,045

(22) Filed: Jun. 1, 2020

(65) Prior Publication Data
US 2020/0380641 A1 Dec. 3, 2020

(30) Foreign Application Priority Data

Jun. 3, 2019 (JP) .............................. JP2019-103745

(51) Int. Cl.
*G06T 5/00* (2006.01)
*G06N 3/04* (2006.01)
*G06N 3/08* (2006.01)
*G06N 3/063* (2006.01)

(52) U.S. Cl.
CPC .............. *G06T 5/002* (2013.01); *G06N 3/04* (2013.01); *G06N 3/063* (2013.01); *G06N 3/08* (2013.01)

(58) Field of Classification Search
None
See application file for complete search history.

(56) References Cited

U.S. PATENT DOCUMENTS

2018/0137605 A1* 5/2018 Otsuka .................... G06T 7/11
2020/0311878 A1* 10/2020 Matsuura ............... G06V 10/82

FOREIGN PATENT DOCUMENTS

JP 2016031747 A 3/2016

OTHER PUBLICATIONS

Burger, 2012. "Image Denoising: Can plain Neural Networks compete with BM3D?" IEEE Conference Computer Vision and Pattern Recognition. 2012: 4321-4328.
Zhang, 2016. "Beyond a Gaussian Denoiser: Residual Learning of Deep CNN for Image Denoising," IEEE Transactions Image process. arXiv:1608.03981v1 [cs.CV]; 2016: 1-13.

* cited by examiner

*Primary Examiner* — Leon Flores
(74) *Attorney, Agent, or Firm* — Rossi, Kimms & McDowell LLP

(57) ABSTRACT

Noise is adequately reduced irrespective of the content of an input image. In an embodiment of the present invention, an image processing apparatus that executes noise reduction processing of an image includes: a first estimation unit that estimates noise contained in the image; a second estimation unit that estimates an original image, which is the image from which the noise is removed; a noise reduction unit that performs the noise reduction processing on each of partial areas of the image by using the first estimation unit or the second estimation unit depending on the contents of the partial areas; and an integration unit that integrates the partial areas on which the noise reduction processing is performed.

14 Claims, 13 Drawing Sheets

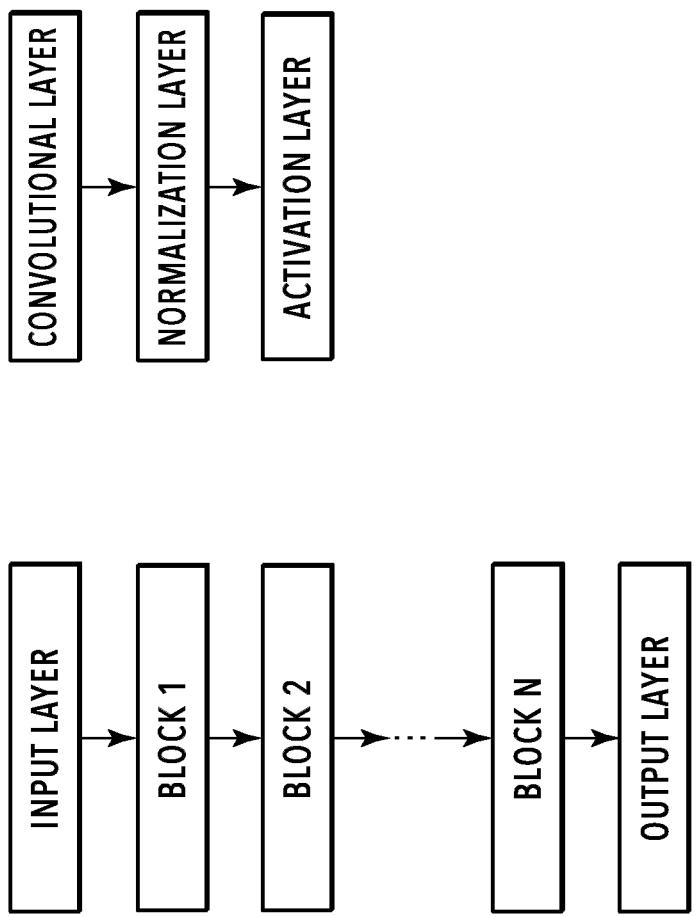
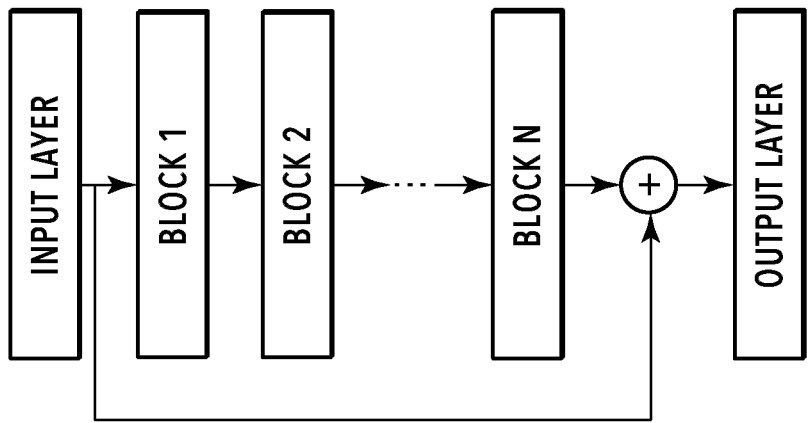

IMAGE PROCESSING APPARATUS, IMAGE PROCESSING METHOD, AND STORAGE MEDIUM

BACKGROUND OF THE INVENTION

Field of the Invention

The present invention relates to a technique for reducing noise in an image.

Description of the Related Art

As a technique of noise reduction processing using a neural network, there has been known a method for estimating directly a denoised original image based on an input image containing noise (H. Burger, C. Schuler, and S. Harmeling. Image denoising: Can plain neural networks compete with BM3D? In IEEE Conf. Computer Vision and Pattern Recognition, pages 4321-4328, 2012; hereinafter, Literature 1). However, depending on the content of the input image, a conventional method that does not use a neural network may achieve a greater noise reduction effect. For example, for a part containing more textures, a conventional method that uses a neural network generates relatively greater residual noise after the noise reduction.

Japanese Patent Laid-Open No. 2016-31747 (hereinafter, Literature 2) discloses a technique of noise reduction processing using a neural network specialized for a specific texture (dedicated NN). However, the learning with the method of Literature 2 is difficult because it is required to provide intermediate data of the neural network (attentional neuron) with teacher data during the learning, and the structure of the neural network is complicated. Additionally, the learning of the dedicated NN is performed using an image of a specific type of object in advance, and the processing on all images not including or recognizing the specific type of object is performed only by a general neural network (general NN). Thus, the improvement in the noise reduction effect has been limited.

On the other hand, there is recently proposed a neural network that estimates noise itself based on an input image containing noise (K. Zhang, W. Zuo, Y. Chen, D. Meng, and L. Zhang, "Beyond a gaussian denoiser: Residual Learning of deep cnn for image denoising," IEEE Trans. Image process. 2016; hereinafter, Literature 3). However, such a neural network is for speed-up and improvement in convergence performance in the learning, and the dependency of the noise reduction effect on the content of the input image is not solved.

As described above, in the conventional noise reduction processing, the noise reduction effects vary depending on the contents of input images, and it is impossible to reduce the noise adequately.

An object of the present invention is to reduce noise adequately irrespective of the content of an input image.

SUMMARY OF THE INVENTION

In an embodiment of the present invention, an image processing apparatus that executes noise reduction processing of an image includes: a first estimation unit that estimates noise contained in the image; a second estimation unit that estimates an original image, which is the image from which the noise is removed; a noise reduction unit that performs the noise reduction processing on each of partial areas of the image by using the first estimation unit or the second estimation unit depending on the contents of the partial areas; and an integration unit that integrates the partial areas on which the noise reduction processing is performed.

Further features of the present invention will become apparent from the following description of exemplary embodiments with reference to the attached drawings.

BRIEF DESCRIPTION OF THE DRAWINGS

FIGS. 6A to 6C are schematic diagrams illustrating a configuration of a neural network of the first embodiment;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In a first embodiment, there is described an example in which excellent noise reduction is implemented by segmenting input image data into multiple patches (i.e., partial areas) and selectively using 2 neural networks based on the results of an analysis on the patches.

Figure 1:
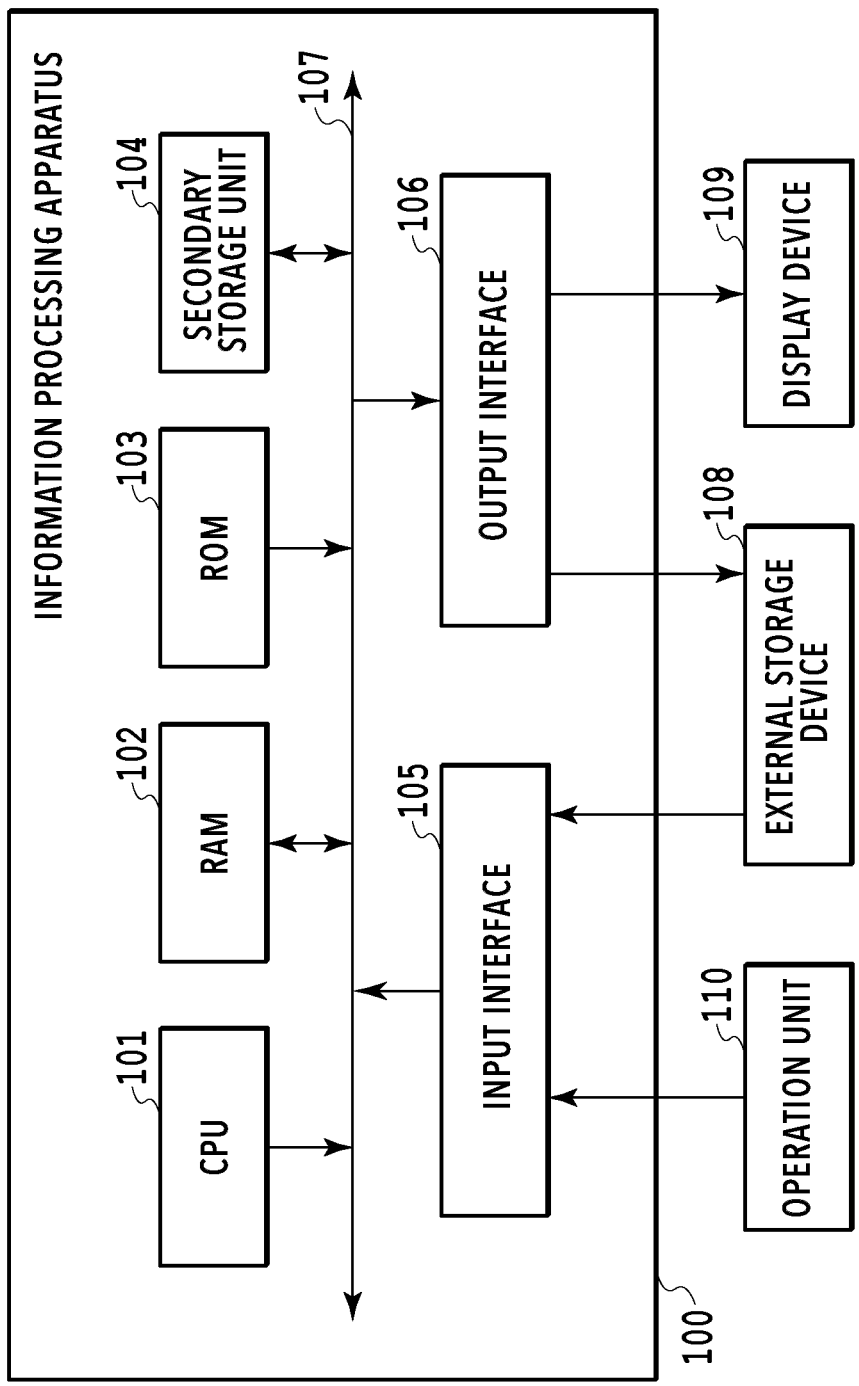
FIG. 1 is a diagram illustrating a hardware configuration example of an information processing apparatus of a first embodiment.

FIG. 1 illustrates a hardware configuration example of an information processing apparatus of the present embodiment. An information processing apparatus 100 includes a CPU 101, a RAM 102, a ROM 103, a secondary storage device 104, an input interface 105 and an output interface 106. Each of the component elements are connected with each other via a system bus 107. The information processing apparatus 100 is connected to an external storage device 108 and an operation unit 110 via the input interface 105. The information processing apparatus 100 is connected to the external storage device 108 and a display device 109 via the output interface 106.

The CPU 101 uses the RAM 102 as a working memory, executes the programs stored in the ROM 103, and controls each of the component elements integrally via the system bus 107. In this way, the later-described various types of processing are executed. The secondary storage device 104 is a storage device storing various kinds of data handled by the information processing apparatus 100, and an HDD is used as the secondary storage device 104 in the present embodiment. The CPU 101 performs writing of data into the secondary storage device 104 and reading of data stored in the secondary storage device 104 via the system bus 107. In the secondary storage device 104, it is possible to use various storage devices other than an HDD, such as an optical disc drive and a flash memory.

The input interface 105 is, for example, a serial bus interface such as a USB or an IEEE 1394. The information processing apparatus 100 inputs data, commands, and so on from the external device via the input interface 105. In the present embodiment, the information processing apparatus 100 obtains data from the external storage device 108 (e.g., a storage medium such as a hard disc, a memory card, a CF card, an SD card, or a USB memory) via the input interface 105. Additionally, in the present embodiment, the information processing apparatus 100 obtains via the input interface 105 an instruction from a user inputted to the operation unit 110. The operation unit 110 is an input device such as a mouse or a keyboard that inputs the instruction from the user.

As with the input interface 105, the output interface 106 is a serial bus interface such as a USB or an IEEE 1394. The output interface 106 may be, for example, a video output terminal such as DVI or HDMI (registered trademark). The information processing apparatus 100 outputs data and so on to the external device via the output interface 106. In the present embodiment, the information processing apparatus 100 outputs data processed by the CPU 101 (e.g., image data) to the display device 109 (any type of image display device such as liquid crystal display) via the output interface 106. Although there are further component elements of the information processing apparatus 100 other than the above, the descriptions thereof are omitted since it is not the point of the present invention.

Hereinafter, processing performed by the information processing apparatus 100 of the present embodiment is described with reference to functional block diagrams illustrated in FIGS. 2, 3, and 4 and a flowchart illustrated in FIG. 5.

Figure 2:
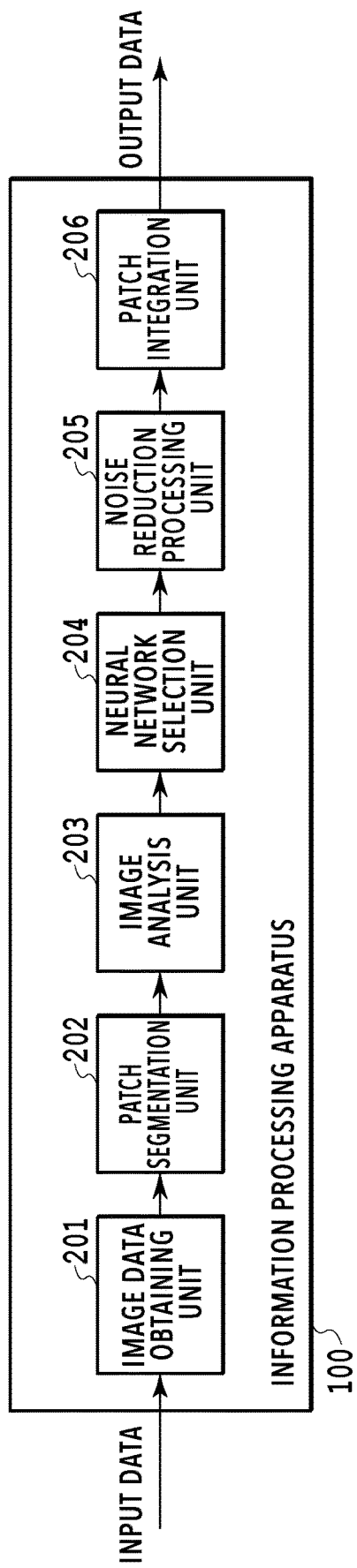
FIG. 2 is a functional block diagram of the information processing apparatus of the first embodiment.

FIG. 2 is a functional block diagram of the information processing apparatus of the present embodiment. The information processing apparatus 100 of the present embodiment includes an image data obtainment unit 201, a patch segmentation unit 202, an image analysis unit 203, a neural network selection unit 204, a noise reduction processing unit 205 and a patch integration unit 206. In the present embodiment, the information processing apparatus 100 is an image processing apparatus executing noise reduction processing on an image.

Figure 3:
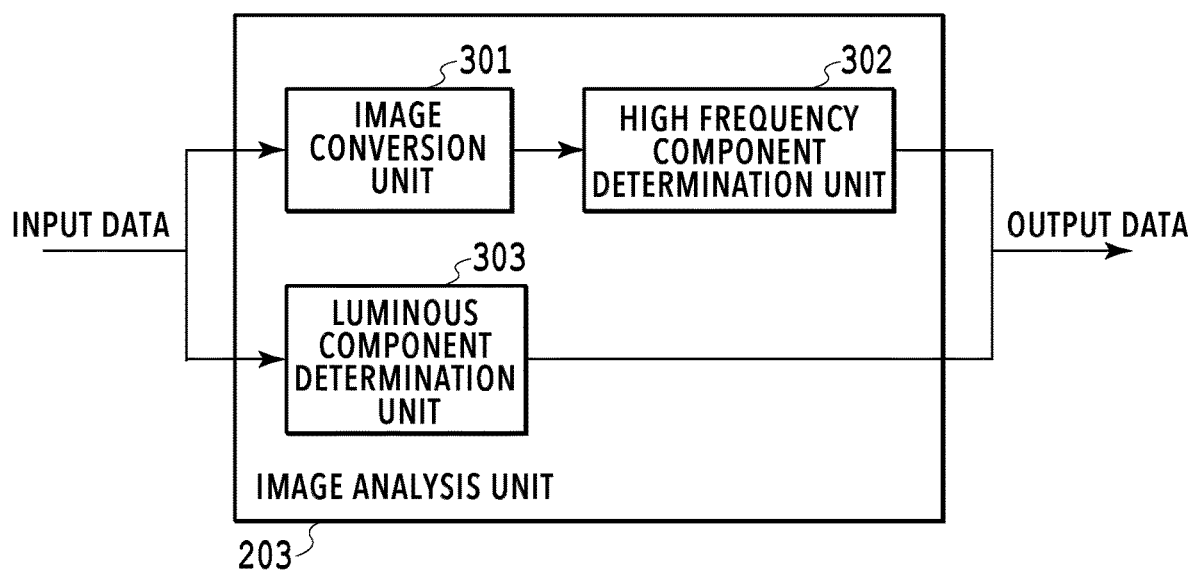
FIG. 3 is a functional block diagram illustrating a configuration example of an image analysis unit of the first embodiment.

FIG. 3 illustrates a configuration example of the image analysis unit 203 of the present embodiment. The image analysis unit 203 includes an image conversion unit 301, a high frequency component determination unit 302 and a luminous component determination unit 303.

Figure 4:
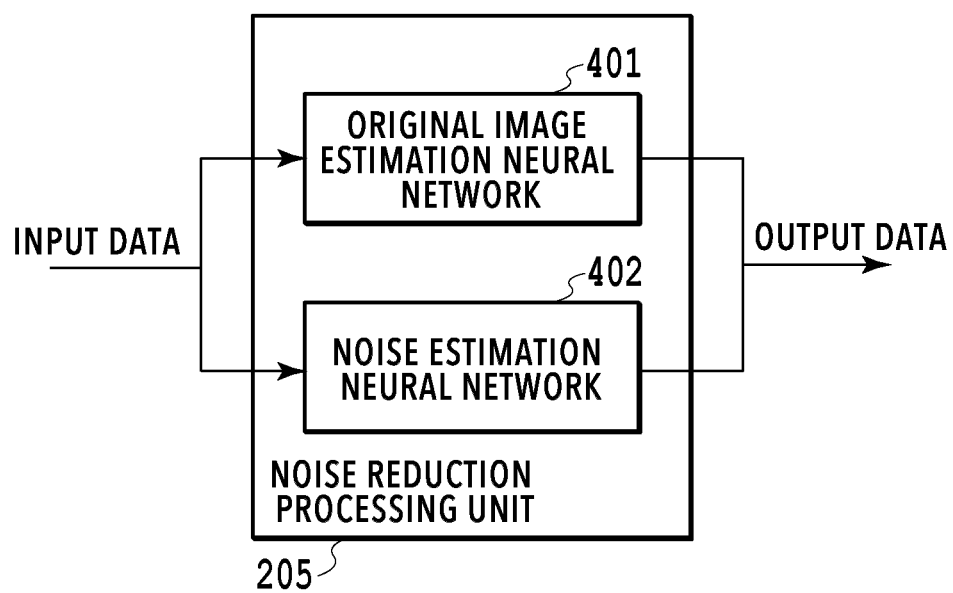
FIG. 4 is a functional block diagram illustrating a configuration example of a noise reduction processing unit of the first embodiment.

FIG. 4 illustrates a configuration example of the noise reduction processing unit 205 of the present embodiment. The noise reduction processing unit 205 includes an original image estimation neural network 401 and a noise estimation neural network 402.

Details of each of the above-described function units are described later with reference to the flowchart in FIG. 5.

The information processing apparatus 100 may be adapted to include dedicated processing circuits comparable to the function units.

Figure 5:
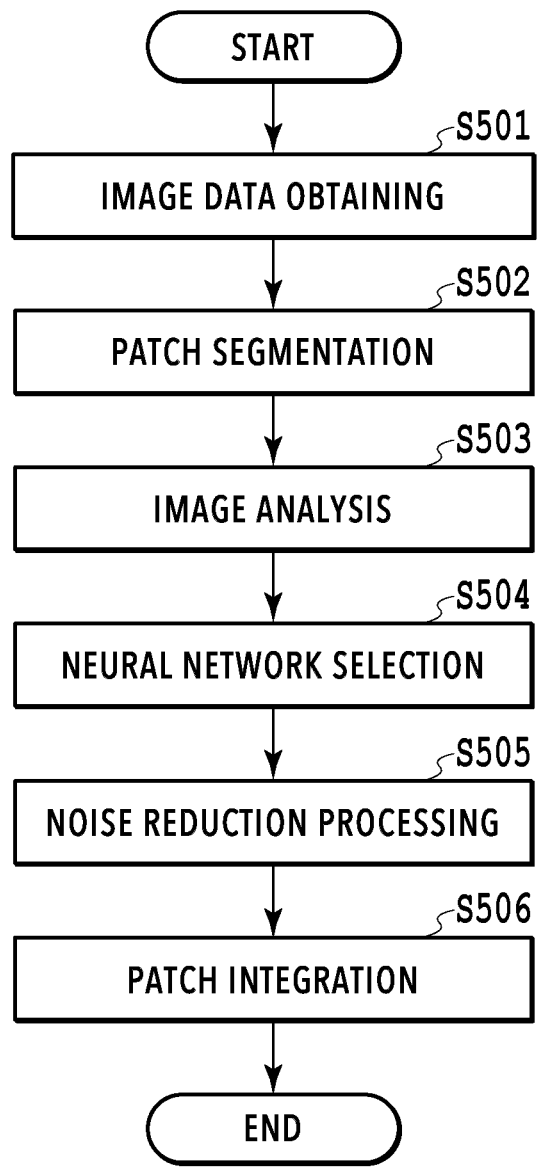
FIG. 5 is a flowchart of noise reduction processing of the first embodiment.

FIG. 5 illustrates a flowchart of noise reduction processing of the present embodiment. Hereinafter, the procedures of the noise reduction processing in the present embodiment are described with reference to the flowchart in FIG. 5. The series of processing illustrated in the flowchart is implemented with the CPU 101 reading out to the RAM 102 program codes stored in a storage area such as the ROM 103 and executing the read programs. Alternatively, a part of or all the functions of steps in the flowchart may be implemented by hardware such as an ASIC or an electronic circuit. The following sign "S" means "step" in the flowchart. It is similar in the other flowcharts.

In S501, the image data obtainment unit 201 obtains image data as a processing target. The image data may be in any format such as RAW or JPEG.

In S502, the patch segmentation unit 202 segments the image data into multiple patches (i.e., partial areas) in predetermined sizes. These patches may be overlapped with each other, and the shapes and the sizes thereof may not be necessarily the same.

In S503, the image analysis unit 203 performs an image analysis on each of the multiple patches. An object of the image analysis is to determine whether a target patch includes a complicated texture (high frequency components) and determine whether the luminance dependent noise in the target patch is at a certain level or more. Luminance dependent noise is a type of noise in which the variance is dependent on the luminance and is always contained in an image due to photon shot noise generated in an image sensor. In specific, the image analysis includes a frequency analysis and a luminance analysis.

In the frequency analysis, first, the image conversion unit 301 of the image analysis unit 203 performs conversion such as Fourier conversion and wavelet conversion on the target patch. Subsequently, in the case where the conversion result shows that, for example, the statistics (maximum, average, median values) of the high frequency components exceed predetermined thresholds, the high frequency component determination unit 302 of the image analysis unit 203 determines that the target patch significantly includes the high frequency components.

In the luminance analysis, in the case where the statistics (maximum, average, median values) of the luminous components of the target patch exceed predetermined thresholds, the luminous component determination unit 303 of the image analysis unit 203 determines that the target patch is high luminance. That is, it is determined that the luminance dependent noise is at a certain level or more.

In the present embodiment, at least either one of the high frequency components and the luminous components may be analyzed to determine whether the high frequency components or the luminous components exceed predetermined thresholds.

In S504, based on the result of the analysis by the image analysis unit 203, the neural network selection unit 204 selects whether to use an original image estimation neural network or a noise estimation neural network to process each of the multiple patches.

In general, it is possible to construe that a neural network has learned the probability density distribution of data to be outputted. As the probability density distribution is more complicated, the learning is more difficult, and the output data estimated by the neural network is more likely to be separated from the true complicated probability density distribution. In other words, data having the probability density distribution more conforming to a simple shape has higher estimation accuracy. The probability density distribution of a denoised ideal image (original image) has a more complicated shape as there are more textures. Thus, as the original image contains fewer textures and the probability density distribution of the original image is in a relatively simple shape, the accuracy of the estimation by the neural network estimating the original image is higher.

On the other hand, the complexity of the probability density distribution of the noise is not dependent on the level of the noise and conforms the shape called gauss distribution even in the case of the luminance dependent noise. Thus, in the case where the original image contains many textures or the estimation accuracy of the original image is deteriorated due to the noise of high level, the accuracy of the estimation by the neural network estimating the noise is relatively higher than that by the neural network estimating the original image.

In the light of the above features, the neural network selection unit 204 selects a neural network as described below.

In the case where the image analysis unit 203 determines that the target patch significantly contains the high frequency components or is the high luminance, the neural network selection unit 204 selects the noise estimation neural network. In other cases, the neural network selection unit 204 selects the original image estimation neural network.

The original image estimation neural network has long been known as disclosed in Literature 1. On the other hand, the noise estimation neural network has been known recently for the high image quality and also the superiority to the speed-up and the convergence performance in learning (Literature 3). However, there has been no techniques focused on the superiorities of those two types of neural networks varied depending on the content of the image, and the complementary relationship therebetween. According to the present embodiment, it is possible to obtain the noise reduction effect that is robust to the variation in the contents of the images by selectively using the neural networks having the complementary effects without increasing the difficulty of the learning.

In S505, the noise reduction processing unit 205 uses the selected one of either the original image estimation neural network 401 or the noise estimation neural network 402 to execute the noise reduction processing on each of the multiple patches.

The configurations of the neural networks are now described with reference to FIGS. 6A to 6C. FIG. 6A illustrates an example of a configuration of a neural network common to both the neural networks of original image estimation and noise estimation. In the present embodiment, although the description is given with a convolutional neural network as an example, it is not limited to the configuration. A pixel value (input data) of the target patch is inputted to an input layer. Thereafter, processing on a block 1 to a block N is sequentially executed, and at last the data is outputted to an output layer. In the case of the original image estimation neural network, the output data is a pixel value of the estimated original image, and in the case of the noise estimation neural network, the output data is a pixel value of the estimated noise. In the latter case, the original image is estimated by subtracting the output data from the input data.

The data transmitted between the blocks is in the form of an image of multiple channels of the same size or of a lower resolution, compared with that of the input data. However, the data is data not directly related to the input data or the output data and having no meaning as an image.

As illustrated in FIG. 6B, although each of the blocks of the convolutional neural network has a configuration in which a convolutional layer, a normalization layer, and an activation layer are connected to each other, each block does not necessarily include all the layers, and the blocks may have different configurations.

The convolutional neural network may include a skip connection for connecting or adding an output from an input layer or an arbitrary block to an output from another block. FIG. 6C illustrates a configuration including the skip connection for adding the input layer to an output from the block N as an example of the configuration of the original image estimation neural network.

The convolutional layer adds a convolutional result of a predetermined filter to each channel of the data to be inputted, and outputs the result. A filter coefficient is determined by the later-described learning. The number of the output channels of the convolutional layer may be determined arbitrarily as long as the filters are prepared in types according to the number of the output channels.

The normalization layer performs linear conversion for correcting the average and the variance of the input data. For example, a coefficient of the linear conversion is determined such that the outputs from the normalization layer in the case where the data for learning is inputted are 0 for the average and 1 for the variance.

The activation layer performs non-linear conversion for each element on the data to be inputted, individually. Specifically, generally known functions such as a sigmoid function, a tanh function, and a ReLU (Rectified Linear Unit) can be used for the non-linear conversion.

The same learning data is used for learning individually in the original image estimation and noise estimation neural networks. The learning in this case indicates determining parameters constructing the neural networks by using the data for learning. The parameters may be the filter coefficient of the convolutional layer and the coefficient of the linear conversion of the normalization layer.

The data for learning is an aggregate of pairs of the input data (student data) and correct values of the output data (teacher data). For the purpose of noise reduction, the student data is a noise image obtained by applying artificial noise to a live-action image or a CG image, while the teacher data is the original image before the noise is applied thereto or is the applied noise itself.

Although it is common to add gauss random numbers with the same variance values to each of the pixels individually to make the artificial noise, it may be used a more realistic noise model such as luminance dependent noise.

As a method without using the artificial noise, it is possible to use as the data for learning an aggregate of pairs of images of the same object captured under different conditions of the setting such as ISO sensitivity involved with the level of the noise. In this method, since it is possible to perform the learning using the actual noise, there is an advantage that the accuracy of estimating the actual noise is higher than that in a method using the artificial noise. However, on the other hand, there is a disadvantage that a small position misalignment may occur between the pairs of the images in some cases, and if processing for aligning the images to achieve the accurate learning is performed, an error that can cause deterioration in the noise estimation accuracy may occur.

In the present embodiment, since the learning of the original image can be used for learning individually by the conventional method in the original image estimation and noise estimation neural networks, the difficulty of the learning is not increased unlike the technique disclosed in Literature 2.

In S506, the patch integration unit 206 integrates all the patches on which the noise reduction processing is executed and outputs a corrected image in which the noise is reduced. In the case where the multiple patches are overlapped with each other, it is possible to generate an image with no artifact reflecting the patch shape by, for example, applying average values between the multiple patches to the overlapping pixels.

As described above, according to the present embodiment, since the noise reduction can be performed for each patch using a neural network adequate for the content of the image, it is possible to reduce the noise adequately irrespective of the content of the input image.

Second Embodiment

In the first embodiment, since the frequency analysis is performed on the image containing the noise, there is a possibility of a wrong determination on the high frequency components due to the noise. To deal with this, in the present embodiment, the frequency analysis is performed on a patch in which the noise is reduced to perform the determination on the high frequency components more accurately. The noise reduction processing by the original image estimation neural network or the noise estimation neural network is performed on the patch.

The hardware configuration of the information processing apparatus in the present embodiment is similar to that of the first embodiment. Hereinafter, the processing performed by the information processing apparatus 100 of the present embodiment is described with reference to a functional block diagram illustrated in FIG. 7 and a flowchart illustrated in FIG. 8.

Figure 7:
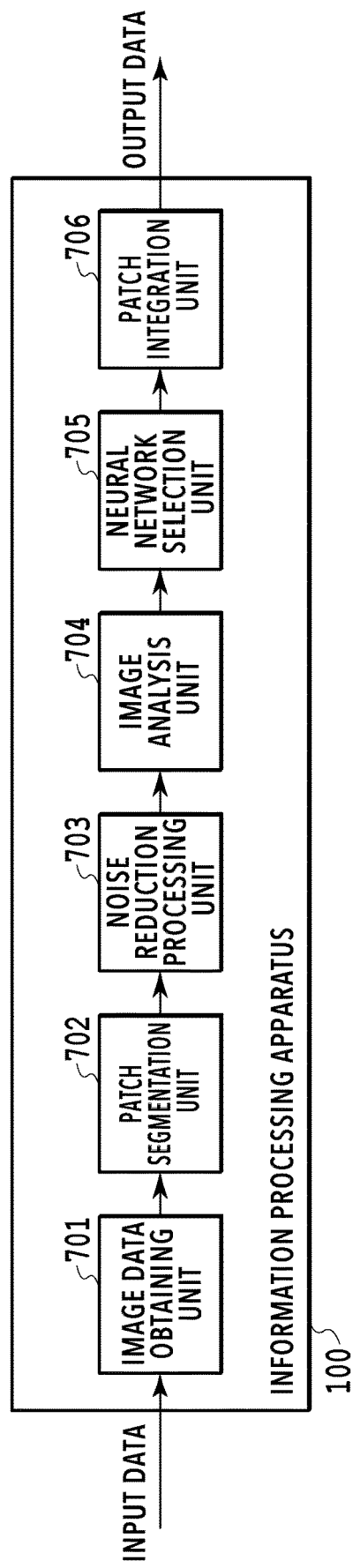
FIG. 7 is a functional block diagram of an information processing apparatus of a second embodiment.

FIG. 7 is a functional block diagram of the information processing apparatus in the present embodiment. The information processing apparatus 100 has functions of an image data obtainment unit 701, a patch segmentation unit 702, a noise reduction processing unit 703, an image analysis unit 704, a neural network selection unit 705, and a patch integration unit 706. In the present embodiment, processing performed by the noise reduction processing unit 703, the image analysis unit 704, and the neural network selection unit 705 is different from that in the first embodiment.

As with the first embodiment, the noise reduction processing unit 703 has functions of the original image estimation neural network 401 and the noise estimation neural network 402 as illustrated in FIG. 4. Although one neural network selected by the neural network selection unit 204 is used in the first embodiment, predetermined one of the neural networks or both the neural networks are used to reduce the noise irrespective of the content of the patch in the present embodiment.

As with the first embodiment, the image analysis unit 704 has functions of the image conversion unit 301, the high frequency component determination unit 302, and the luminous component determination unit 303 as illustrated in FIG. 3. In the present embodiment, unlike the first embodiment, the image analysis is performed on a patch image in which the noise is reduced.

According to the result of the analysis of the image analysis unit 704, the neural network selection unit 705 uses either of the original image estimation neural network and the noise estimation neural network to select the patch image in which the noise is reduced.

The information processing apparatus 100 may be adapted to include dedicated processing circuits comparable to the units.

Figure 8:
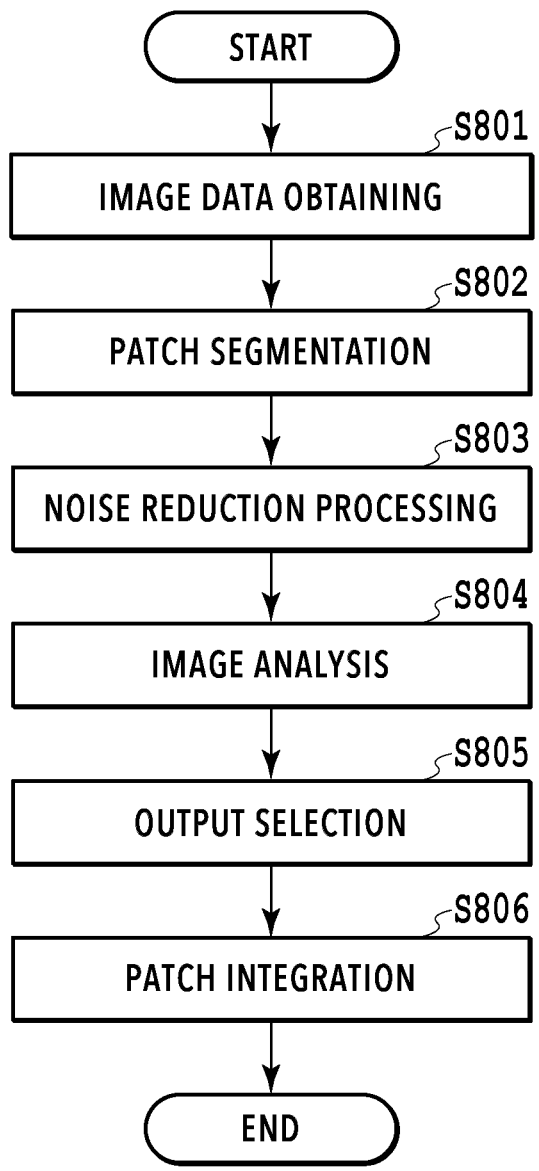
FIG. 8 is a flowchart of noise reduction processing of the second embodiment.

FIG. 8 illustrates a flowchart of the noise reduction processing in the present embodiment. Hereinafter, the procedures of the noise reduction processing in the present embodiment are described with reference to a flowchart in FIG. 8.

In S801, the image data obtainment unit 701 obtains image data as a processing target. The image data may be in any format such as RAW or JPEG.

In S802, the patch segmentation unit 702 segments the image data into multiple patches in a predetermined size. These patches may be overlapped with each other, and the shapes and the sizes thereof may not be necessarily the same.

In S803, the noise reduction processing unit 703 uses either one of or both the original image estimation neural network 401 and the noise estimation neural network 402 to execute the noise reduction processing on each of the multiple patches.

In S804, the image analysis unit 704 performs the image analysis on each of the multiple patches on which the noise reduction processing is executed by the noise reduction processing unit 703.

In S805, based on the result of the image analysis, the neural network selection unit 705 selects whether to use a result of the noise reduction processed by the original image estimation neural network or by the noise estimation neural network, for each of the multiple patches. In the case where the output from the selected neural network is not obtained in S803, the noise reduction processing unit 703 further performs the noise reduction processing.

In S806, the patch integration unit 706 integrates all the patches selected by the neural network selection unit 705 and outputs a corrected image in which the noise is reduced. In the case where the multiple patches are overlapped with each other, it is possible to generate an image with no artifact reflecting the patch shape by applying an average value between the multiple patches to the overlapping pixels, for example.

As described above, it is also possible to adequately reduce the noise irrespective of the content of an input image according to the functional configuration of the present embodiment. Additionally, in the present embodiment, since the image analysis is performed on the patch in which the noise is reduced it is possible to perform the image analysis more accurately.

Third Embodiment

In the first embodiment, selecting the neural network has 2 stages of the image analysis and the determination. This processing is possible to be alternatively performed by a third neural network (hereinafter, referred to as selection NN) for selecting whether to use the original image estimation neural network or the noise estimation neural network. Hereinafter, although the description is given with the case where the neural network is selected before the noise reduction processing as an example as with the first embodiment, the configuration may be also applicable to the second embodiment.

The hardware configuration of the information processing apparatus in the present embodiment is similar to that in the first embodiment. Hereinafter, the processing performed by the information processing apparatus 100 of the present embodiment is described with reference to a functional block diagram illustrated in FIG. 9 and a flowchart illustrated in FIG. 10.

Figure 9:
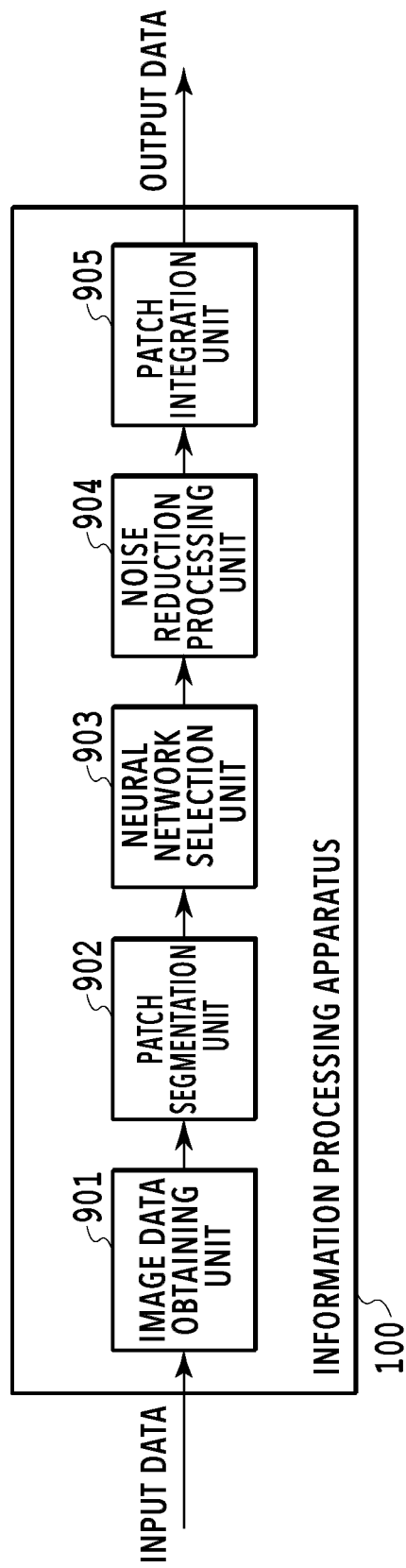
FIG. 9 is a functional block diagram of an information processing apparatus of a third embodiment.

FIG. 9 is a functional block diagram of the information processing apparatus of the present embodiment. As illustrated in FIG. 9, the information processing apparatus 100 has functions of an image data obtainment unit 901, a patch segmentation unit 902, a neural network selection unit 903, a noise reduction processing unit 904, and a patch integration unit 905. In the present embodiment, unlike the first embodiment, no image analysis unit is included, and the neural network selection unit 903 uses the selection NN to select either one of the original image estimation neural network and the noise estimation neural network.

The information processing apparatus 100 may be adapted to include dedicated processing circuits comparable to the units.

Figure 10:
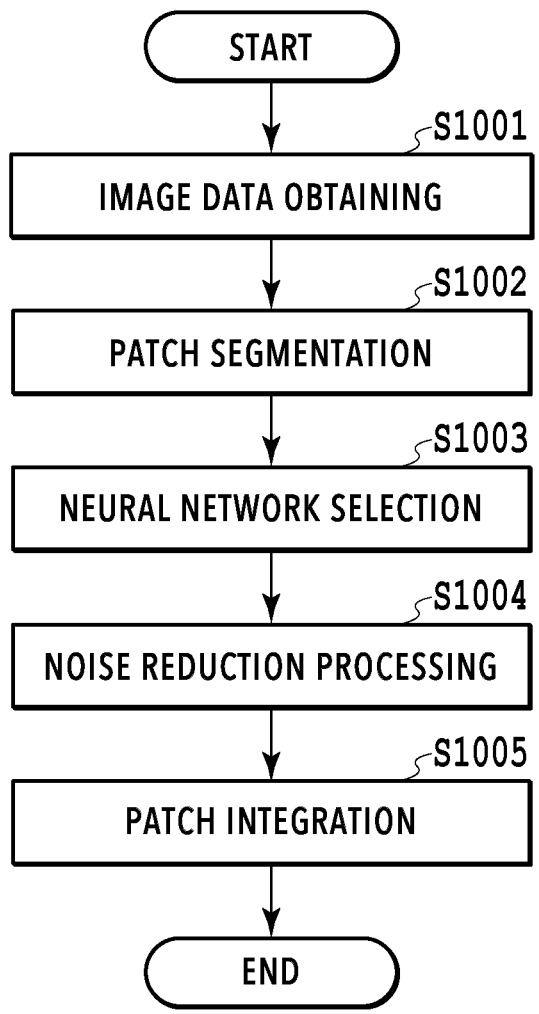
FIG. 10 is a flowchart of noise reduction processing of the third embodiment.

FIG. 10 illustrates a flowchart of the noise reduction processing of the present embodiment. Hereinafter, the procedures of the noise reduction processing of the present embodiment are described with reference to the flowchart in FIG. 10.

Unlike the first embodiment, the image analysis is not performed in the noise reduction processing of the present embodiment. In the present embodiment, in S1003, the neural network selection unit 903 uses the selection NN to select a neural network based on the patch at 1 stage. This requires learning of the selection NN in advance. In the learning of the selection NN, first, an aggregate of pairs of the patch (student data) and the determination result (teacher data) is prepared as the data for learning. The determination result is data indicating whether to use the original image estimation neural network or the noise estimation neural network. As with the output from the image analysis unit 203 of the first embodiment, the determination result may be data indicating a determination result showing whether there are the high frequency components and whether the patch is the high luminance. The form of the data may be a scalar value of 1 bit (2 values), and in this case, for example, if the original image estimation is selected, the value may be 0, and if the noise estimation is selected, the value may be 1. In the latter case, a scalar value of 2 bits (4 values) may be applied. The teacher data may be set manually or may be generated automatically using the image analysis unit 203 and the neural network selection unit 204 used in the first embodiment. For the accuracy improvement and the robustness of the selection NN, the student data used for learning desirably uses as many and various as possible of images (patches).

Figure 11A:
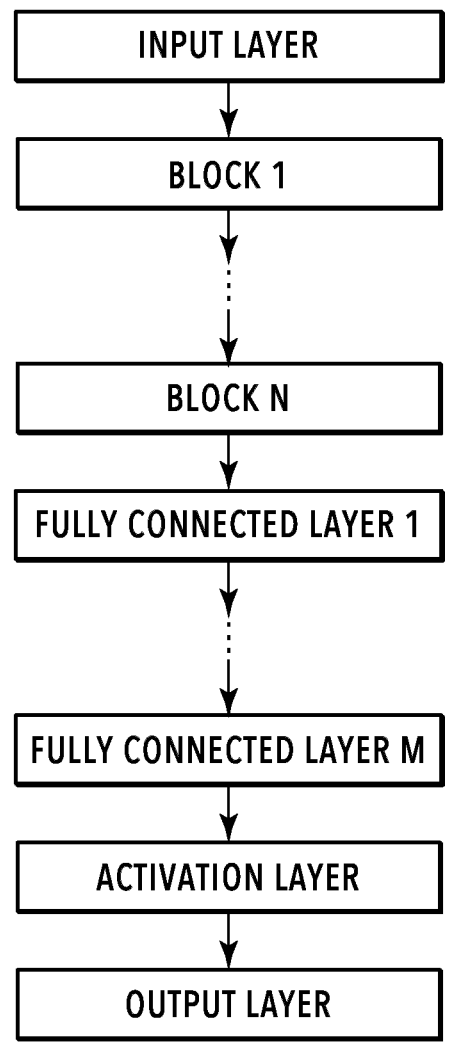
FIGS. 11A and 11B are schematic diagrams illustrating a configuration of a selection neural network of the third embodiment.
Figure 11B:
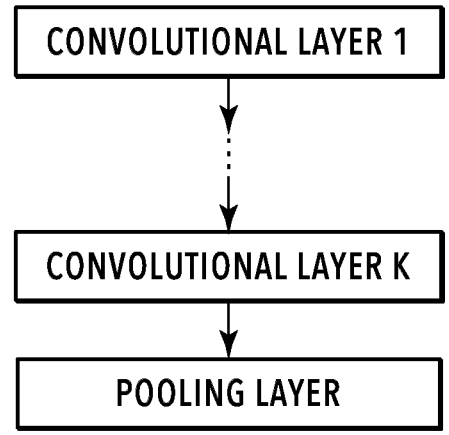

Hereinafter, the configuration of the selection NN is described with reference to FIGS. 11A and 11B. FIG. 11A illustrates an example of the overall configuration of the selection NN. Although the description is given with the convolutional neural network (CNN: Convolutional NN) as an example in the present embodiment, it is not limited to the configuration.

In the configuration illustrated in FIG. 11A, first, a pixel value (input data) of the target patch is inputted to an input layer. Thereafter, processing on a block 1 to a block N is sequentially executed, and the data is sequentially outputted to a fully connected layer 1, a fully connected layer M, an activation layer, and finally an output layer. As illustrated in FIG. 11B, each of the blocks may have a configuration in which multiple convolutional layers 1 to K are connected to a pooling layer. The pooling layer segments the input image into patches in the same shape not overlapping with each other and outputs values such as the maximum value and an average value of the pixel value to each patch to generate a low resolution image. The blocks may have different configurations, and, in the configurations, the resolution (image size of each channel) may be reduced by each convolutional layer and a later block may have more channels, for example. The output data of the selection NN is, for example, in the form of the above-described scalar value of 1 bit or 2 bits.

Since the other processing is similar to that in the first embodiment, the description thereof is omitted.

As described above, in the present embodiment, the selection NN as the third neural network alternatively performs the selection of the original image estimation neural network or the noise estimation neural network. This makes it possible to perform the selection of the neural network to be used for the noise reduction processing of the target patch at 1 stage.

Fourth Embodiment

Since the outputs of the same neural network are used for each patch in the first to third embodiments, the noise reduction effect may be varied stepwise in the image, and consequently there may be generated an artifact reflecting the patch shape. To deal with this, in the present embodiment, there is described an example of generating a noise-reduced image with no strangeness in the appearance by selecting whether to use the output from the original image estimation neural network or that from the noise estimation neural network for each pixel.

The hardware configuration of the information processing apparatus in the present embodiment is similar to that of the first embodiment. Hereinafter, the processing performed by the information processing apparatus 100 of the present embodiment is described with reference to functional block diagrams illustrated in FIGS. 12A and 12B and flowcharts illustrated in FIGS. 13A and 13B.

Figure 12A:
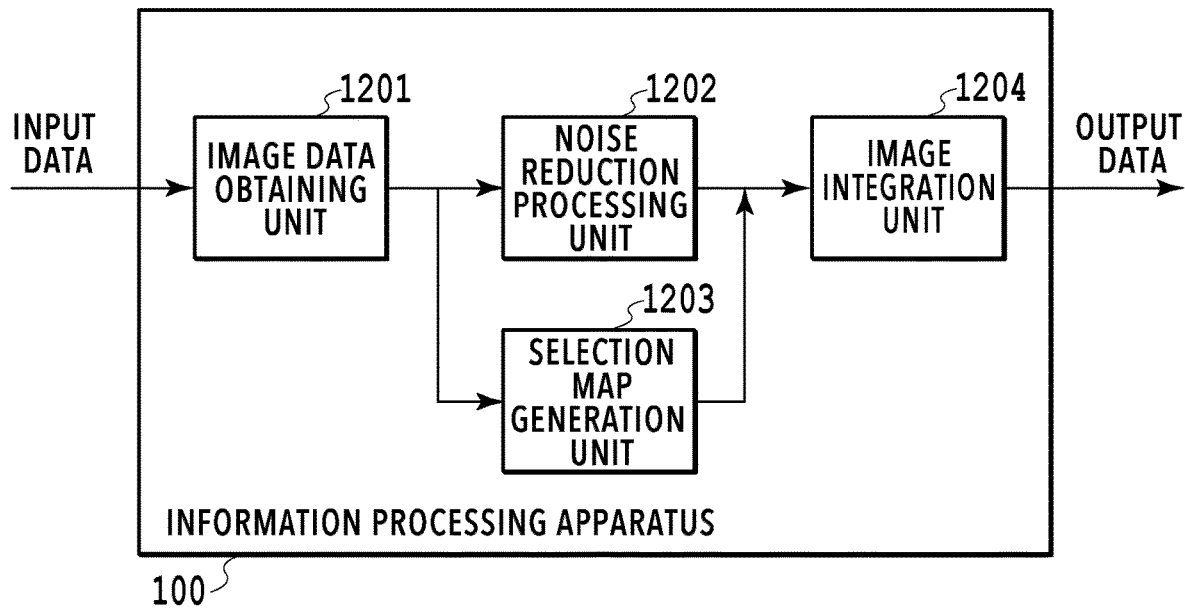
FIGS. 12A and 12B are functional block diagrams of an information processing apparatus of a fourth embodiment.
Figure 12B:
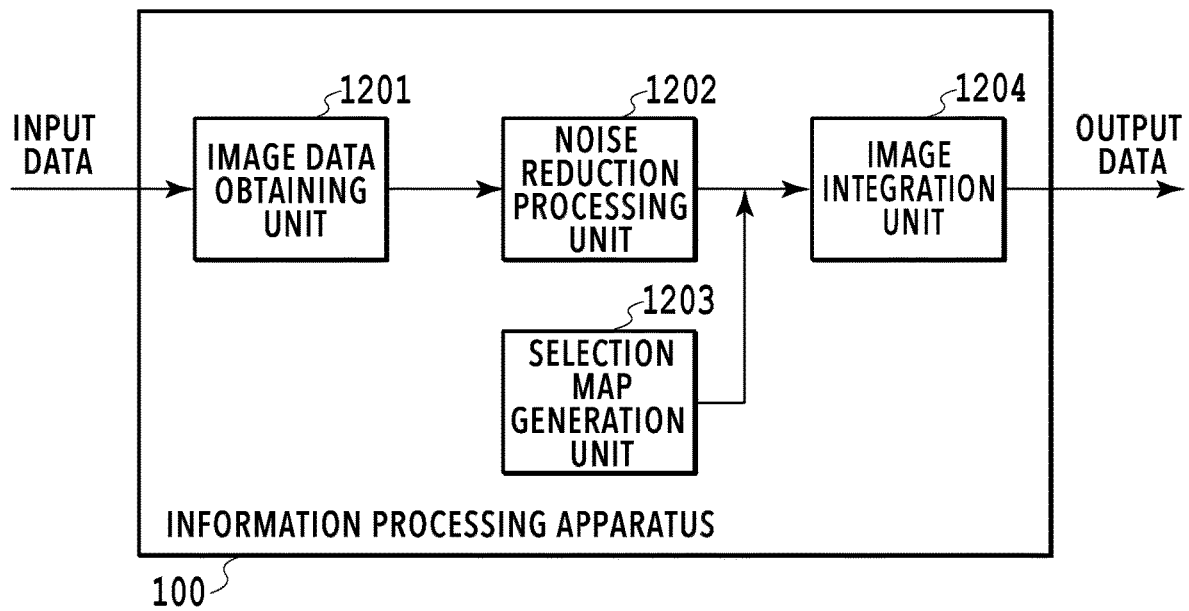

FIGS. 12A and 12B are functional block diagrams of the information processing apparatus of the present embodiment. FIG. 12A is a functional block diagram of the case where the determination on the selection of the neural network is performed before the noise reduction processing as with the first embodiment. FIG. 12B is a functional block diagram of the case where the determination on the selection of the neural network is performed after the noise reduction processing as with the second embodiment. As illustrated in FIGS. 12A and 12B, the information processing apparatus 100 has functions of an image data obtainment unit 1201, a noise reduction processing unit 1202, a selection map generation unit 1203, and an image integration unit 1204.

Figure 13A:
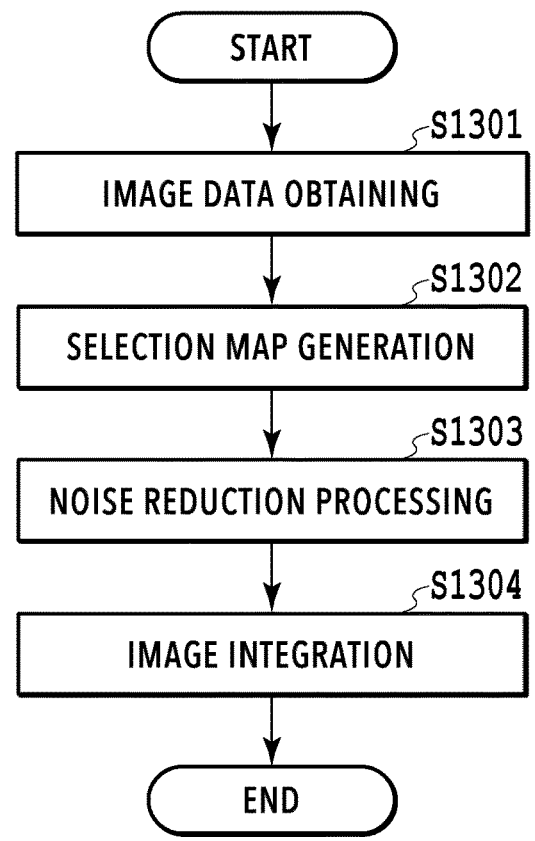
FIGS. 13A and 13B are flowcharts of noise reduction processing of the fourth embodiment.
Figure 13B:
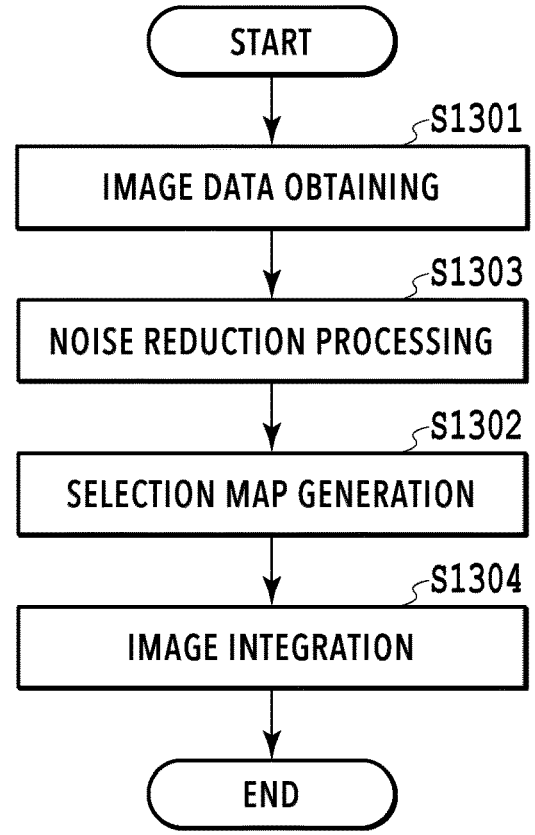

FIGS. 13A and 13B are flowcharts of the noise reduction processing of the present embodiment. Hereinafter, the procedures of the noise reduction processing in the present embodiment are described with reference to the flowcharts in FIGS. 13A and 13B. FIG. 13A is a flowchart implemented by the information processing apparatus 100 including the function units illustrated in FIG. 12A. FIG. 13B is a flowchart implemented by the information processing apparatus 100 including the function units illustrated in FIG. 12B.

First, the flowchart in FIG. 13A is described.

In S1301, the image data obtainment unit 1201 obtains image data as a processing target. The image data may be in any format such as RAW or JPEG.

In S1302, the selection map generation unit 1203 generates a selection map indicating selection information showing whether to use the output from the original image estimation neural network or that from the noise estimation neural network for each pixel of the obtained image data. The selection map is in the form of an image in the same size as the input image, and a value of each pixel may at least be the data indicating which output is to be used, such as a scalar value of 1 bit or 2 bits as with the third embodiment. A method of generating the selection map may be a method of performing the image analysis on each patch including a reference pixel at the center thereof, and applying the selection information to the reference pixel, or may be a method of deriving the selection map directly from the inputted image without performing the image analysis.

In the method of performing the image analysis on each patch and applying the selection information, the selection information is determined by extracting the patch including the reference pixel at the center thereof from the image inputted to the selection map generation unit 1203, and performing the image analysis on the extracted patch as with the first embodiment. A repetition of the processing of scanning each pixel of the input image makes it possible to obtain an image in the same size as the input image (i.e., selection map).

The method of deriving directly the selection map without performing the image analysis may be a method of using the selection NN as with the third embodiment. In the present embodiment, the target of both the input and the output of the selection NN is not the patches, but the entire image. For the learning of the selection NN, an original image or an image to which the noise is applied is used as the student data, and a correct selection map is used as the teacher data. The correct selection map may be generated manually or may be generated automatically by scanning the patch and using the image analysis unit 203 and the neural network selection unit 204 as with the first embodiment.

Thus, in the flowchart in FIG. 13A, the selection map is generated directly from the obtained image data.

In S1303, for the obtained image data, the noise reduction processing unit 1202 uses the original image estimation and noise estimation neural networks and generates images in which the noise is reduced, respectively. As illustrated in FIG. 4 of the first embodiment, the noise reduction processing unit 1202 has functions of the original image estimation neural network 401 and the noise estimation neural network 402. Unlike the first embodiment, in the present embodiment, output images of both the original image estimation neural network and the noise estimation neural network are generated.

In S1304, according to the selection map, the image integration unit 1204 obtains a pixel value of each pixel from the output image of either of the original image estimation neural network and the noise estimation neural network, and integrates the images to generate a corrected image in which the noise is reduced.

The flowchart in FIG. 13B is different from the flowchart in FIG. 13A in that the selection map is generated from the output image in which the noise is reduced by using each of the original image estimation and noise estimation neural networks. The other processing is similar to that of the flowchart in FIG. 13A.

As described above, according to the present embodiment, it is possible to generate a noise-reduced image with no strangeness in the appearance, since the original image estimation neural network or the noise estimation neural network is selected for each pixel.

Fifth Embodiment

In the first to fourth embodiments, only a pixel value of the output image of either one of the original image estimation neural network and the noise estimation neural network is used to generate a corrected image in which the noise is reduced. In this case, since the noise reduction effect is different between the patches or the pixels, there may be consequently generated an unnatural unevenness on the corrected image. To deal with this, in the present embodiment, a method of generating a corrected image by using a weighted average of outputs from 2 neural networks.

In the case of using the image analysis for each patch, as described in the first embodiment, the statistics of the high frequency components by the frequency analysis and the statistics of the luminous components by the luminance analysis are calculated to determine a weight coefficient α based on the calculated results, and a weighted average according to the following equation (1) is the pixel value of the corrected image:

$$y = \alpha x_1 + (1-\alpha) x_2 \qquad (1)$$

where y is a vector representing an aggregate of pixel values of patches of the correction result, $x_1$ is a vector representing an aggregate of output values of the noise estimation neural network, $x_2$ is a vector representing an aggregate of output values of the original image estimation neural network, α is a real number that is 0 or greater and 1 or smaller. In the case where the patches are overlapped with each other, a value such as an average value of y calculated for each patch is used as the pixel value of the overlapping area.

In the case where the weighted average is performed for each pixel, y, $x_1$, and $x_2$ are values of one pixel in which a representative pixel of the patch used for determining a (e.g., central pixel of patch). It is possible to obtain a according to, for example, the following equation (2), where H represents the statistics of the high frequency components of the target patch, $\theta_H$ represents a threshold thereof, L represents the statistics of the luminous components of the target patch, and $\theta_L$ represents a threshold thereof. In this case, $a_H$ and $a_L$ are parameters of the real numbers that determine the steepness of the variation in α.

$$\alpha = \frac{1}{z}\left[\frac{1}{1+\exp\{-\alpha_H(H-\theta_H)\}} + \frac{1}{1+\exp\{-\alpha_L(L-\theta_L)\}}\right]. \qquad (2)$$

On the other hand, instead of performing the image analysis, it is possible to determine a by a fourth neural network (hereinafter, referred to as weight determination NN). The weight determination NN is the selection NN in the third embodiment that is expanded such that the outputs become multiple-values or continuous values. The learning of the weight determination NN is the same as that of the selection NN except that the learning is performed with the teacher data replaced with the multiple-values or the continuous values.

As described above, in the present embodiment, the greater the ratio of the high frequency components, the more the weight on the output value of the noise estimation neural network increased. In the case where the statistics of the high frequency components exceed a predetermined threshold, the weight on the output value of the original image estimation neural network may be 0. The greater the ratio of the luminous component, the more the weight on the output value of the noise estimation neural network is increased. In the case where the statistics of the luminous components exceed a predetermined threshold, the weight on the output value of the original image estimation neural network may be 0, and in the case where the statistics of the luminous components is equal to or smaller than the predetermined threshold, the weight on the output value of the noise estimation neural network may be 0.

As described above, in the present embodiment, since a corrected image is generated by using a weighted average of the outputs from the 2 neural networks, it is possible to inhibit an unnatural unevenness that may be generated on the corrected image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to adequately reduce noise irrespective of the content of an input image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103745, filed Jun. 3, 2019, which is hereby incorporated by reference wherein in its entirety.

What is claimed is:

1. An image processing apparatus that executes noise reduction processing of an image, the image processing apparatus comprising:
a memory storing instructions; and
a processor that implements the instructions to:
estimate noise contained in the image;
estimate an original image where the noise has been removed from the image;
analyze at least high frequency components or luminous components of each of partial areas of the image;
perform the noise reduction processing on each of the partial areas of the image, wherein, in a case where the high frequency components or the luminous components of a partial area, among the partial areas:
exceed a predetermined threshold, the noise reduction processing is performed on the partial area using the noise; and
does not exceed the predetermined threshold, the noise reduction processing performed on the partial area using the estimated original image; and
integrate the partial areas where the noise reduction processing has been performed.

2. The image processing apparatus according to claim 1, wherein the processor:
estimates the noise using a first neural network on which learning is performed to estimate the noise contained in the image, and
estimates the original image using a second neural network on which learning is performed to estimate the original image.

3. An image processing apparatus that executes noise reduction processing of an image, the image processing apparatus comprising:
a memory storing instructions; and
a processor that implements the instructions to:
estimate noise contained in the image;
estimate an original image where the noise has been removed from the image;
perform the noise reduction processing on each of partial areas of the image using at least the noise or the estimated original image;
analyze high frequency components of the partial areas where the noise reduction processing has been performed; and
integrate the partial areas where the noise reduction processing has been performed,
wherein in a case where the high frequency components of a partial area, among the partial areas:
exceed a predetermined threshold, the noise reduction processing is performed on the partial area using the noise; and
does not exceed the predetermined threshold, the noise reduction processing is performed on the partial area using the estimated original image.

4. The image processing apparatus according to claim 3, wherein the processor:
estimates the noise using a first neural network on which learning is performed to estimate the noise contained in the image, and
estimates the original image using a second neural network on which learning is performed to estimate the original image.

5. The image processing apparatus according to claim 3, wherein a selection map used to select, for each pixel, either of images on which the noise reduction processing has been performed using the noise or the estimated original image.

6. The image processing apparatus according to claim 3, wherein the processor, in integrating the partial areas, applies a weight to each of output values of the noise and the estimated original image, calculates a weighted average of the output values based on the weights, and integrates the partial areas.

7. An image processing method of reducing noise in an image, the image processing method comprising:
- estimating noise contained in the image;
- estimating an original image where the noise has been removed from the image;
- analyzing at least high frequency components or luminous components of each of partial areas of the image;
- performing noise reduction processing on each of the partial areas of the image, wherein, in a case where the high frequency components or the luminous components of a partial area, among the partial areas:
  - exceed a predetermined threshold, the noise reduction processing is performed on the partial area using the noise; and
  - does not exceed the predetermined threshold, the noise reduction processing is performed on the partial area using the estimated original image; and
- integrating the partial areas where the noise reduction processing has been performed.

8. An image processing method of reducing noise in an image, the image processing method comprising:
- estimating noise contained in the image;
- estimating an original image where the noise has been removed from the image;
- performing noise reduction processing on each of partial areas of the image using at least the noise or the estimated original image;
- analyzing high frequency components of the partial areas where the reduction processing has been performed; and
- integrating the partial areas where the noise reduction processing has been performed,
- wherein in case where the high frequency components of a partial area, among the partial areas:
  - exceed a predetermined threshold, the noise reduction processing is performed on the partial area using the noise; and
  - does not exceed the predetermined threshold, the noise reduction processing is performed on the partial area using the estimated original image.

9. The image processing method according to claim 8, wherein a selection map used to select, for each pixel, either of images on which the noise reduction processing has been performed using the noise or the estimated original image.

10. The image processing method according to claim 8, wherein the integrating includes applying a weight to each of output values of the noise and the estimated original image, calculating a weighted average of the output values based on the weights, and integrating the partial areas.

11. A non-transitory computer readable storage medium storing a program executable by a computer to perform a method of reducing noise in an image, the method comprising:
- estimating noise contained in the image;
- estimating an original image where the noise has been removed from the image;
- analyzing at least high frequency components or luminous components of each of partial areas of the image;
- performing noise reduction processing on each of the partial areas of the image, wherein, in a case where the high frequency components or the luminous components of a partial area, among the partial areas:
  - exceed a predetermined threshold, the noise reduction processing is performed on the partial area using the noise; and
  - does not exceed the predetermined threshold, the noise reduction processing is performed on the partial area using the estimated original image; and
- integrating the partial areas where the noise reduction processing has been performed.

12. A non-transitory computer readable storage medium storing a program executable by a computer to perform a method of reducing noise in an image, the method comprising:
- estimating noise contained in the image;
- estimating an original image where the noise has been removed from the image;
- performing noise reduction processing on each of partial areas of the image using at least the noise or the estimated original image;
- analyzing high frequency components of the partial areas where the reduction processing has been performed; and
- integrating the partial areas where the noise reduction processing has been performed,
- wherein in case where the high frequency components of a partial area, among the partial areas:
  - exceed a predetermined threshold, the noise reduction processing is performed on the partial area using the noise in a case where the high frequency components exceed a predetermined threshold; and
  - the estimated original image in the other case.

13. The non-transitory computer readable storage medium according to claim 12, wherein a selection map used to select, for each pixel, either of images on which the noise reduction processing has been performed using the noise or the estimated original image.

14. The non-transitory computer readable storage medium according to claim 12, wherein
the integrating includes applying a weight to each of output values of the noise and the estimated original image, calculating a weighted average of the output values based on the weights, and integrating the partial areas.

* * * * *